Sept. 26, 1944. L. M. POTTS Re. 22,550

TELEGRAPH PRINTER

Original Filed May 9, 1940 4 Sheets-Sheet 1

INVENTOR.
LOUIS M. POTTS

BY H. B. Whitfield
ATTORNEY.

TELEGRAPH PRINTER

Original Filed May 9, 1940 4 Sheets-Sheet 2

INVENTOR.
LOUIS M. POTTS

BY H. B. Whitfield
ATTORNEY

TELEGRAPH PRINTER

Original Filed May 9, 1940 4 Sheets-Sheet 3

INVENTOR.
LOUIS M. POTTS

BY H. B. Whitfield
ATTORNEY

TELEGRAPH PRINTER

Original Filed May 9, 1940 4 Sheets-Sheet 4

INVENTOR
LOUIS M. POTTS

BY H. B. Whitfield
ATTORNEY

Reissued Sept. 26, 1944 Re. 22,550

UNITED STATES PATENT OFFICE 22,550

TELEGRAPH PRINTER

Louis M. Potts, Evanston, Ill., assignor to Teletype Corporation, Chicago, Ill., a corporation of Delaware Original No. 2,323,932, dated July 13, 1943, Serial No. 334,108, May 9, 1940. Application for reissue June 19, 1944, Serial No. 540,934

12 Claims. (Cl. 178—28)

The present invention relates to printing telegraph apparatus and more particularly to type wheel printers having a plurality of printing positions.

The principal object of the present invention resides in the provision of printing and selecting apparatus designed to enlarge the range of selective possibilities without extensive modification of fundamental practices in printing telegraph selecting apparatus and without having to change the essential mechanism.

The use of a plurality of case shift signals in controlling the operation of telegraph printing apparatus is generally known but certain novel aspects herewith introduced have to do with a conversion system for adapting existent practices in design and manufacture of type wheel printers to the use of a greater number of case shift control functions. As an incident to this practice, there is contemplated under one embodiment the utilization of a six-unit code for the supervision of apparatus constituted essentially of a five-unit selection and control mechanism, the presence or absence of the sixth impulse being a determining factor in establishing a secondary case shift control while the conventional pair of case shift signals are utilized additionally to the said sixth impulse case shift control for performing the primary case shift supervision. As a result, four instead of only two case shift conditions are provided, and these with but minimum modification in the essential design of a type wheel printer, such as that disclosed in copending application Serial No. 193,642, filed March 3, 1938.

In a type wheel printer of the design herein contemplated, the type wheel carrying shaft is a frictionally driven member surrounded by a number of parallelly disposed selector pins. A shaft stop arm engages one of these pins when any of the latter is brought into selective condition established by an individual disposition of five selector discs, each provided with peripherally disposed notch and lug attributes, and the several adapted to be moved in response to the selective operation of a line signal supervised transfer mechanism.

In addition to carrying the type wheel and accordingly positioning the latter angularly so as to present predetermined type faces into printing position, the type wheel carrying shaft is also utilized for supporting and rotating with it divers incidental function performing interponent elements. When certain one or ones of said elements are arrested in predetermined angular positions as controlled by the type wheel shaft arresting apparatus, there are conditioned corresponding one or ones of several function performing levers for executing miscellaneous incidental operations; viz., primary case shift, carriage return, etc.

An additional set of case shift control functions identified as secondary to the conventional case shift operation is contemplated such that their incorporation into existing apparatus may permit of an enlargement of several selective possibilities to an extent of doubling the available selective possibilities based on previous practice.

For a more comprehensive understanding of the present invention, reference may be had to the accompanying drawings and to the detailed specification following hereinafter in which similar reference characters indicate corresponding parts throughout, and in which.

Figure 11:
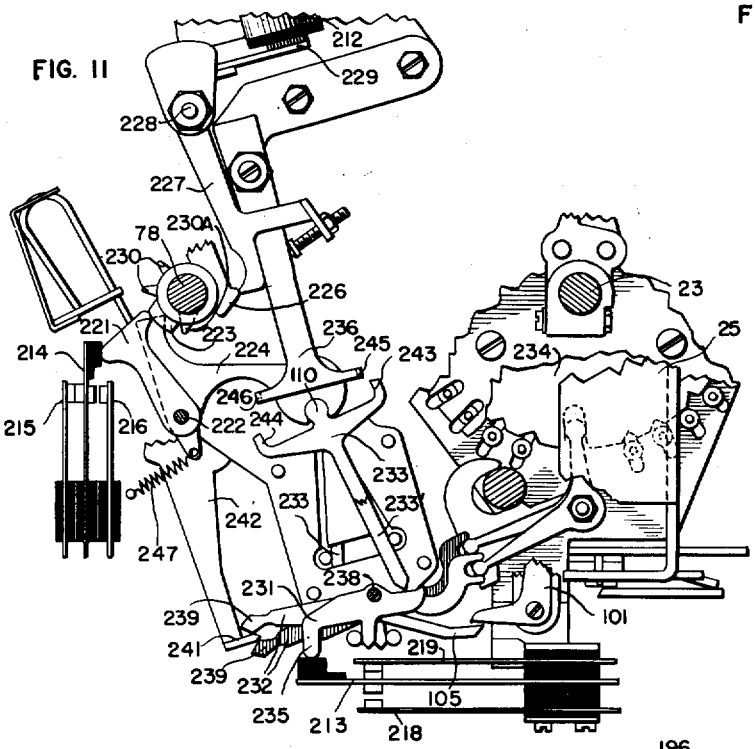
Fig. 11 is a fragmentary plan section of a second modification apparatus.
Figure 13:
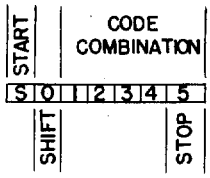
Figure 12:
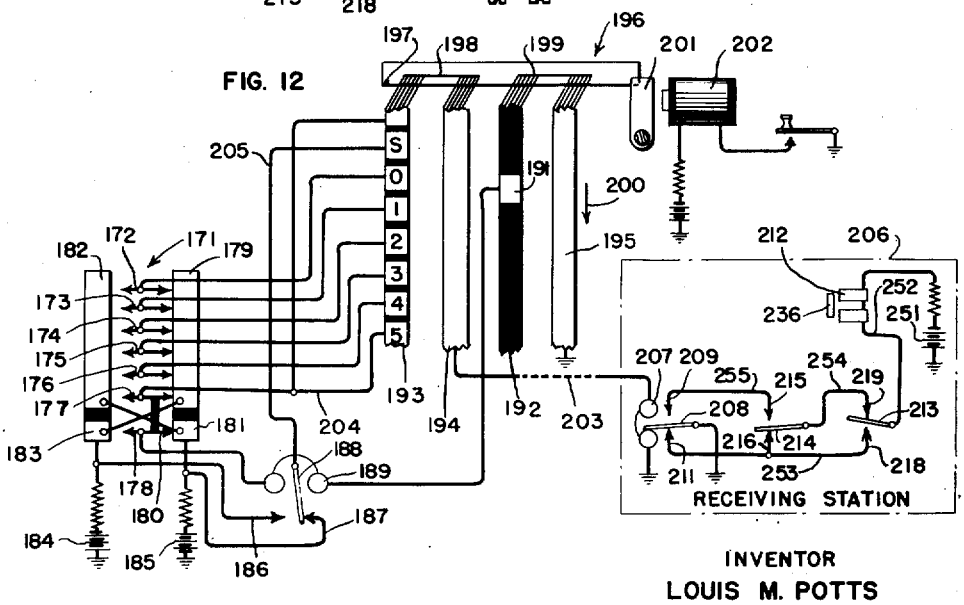

Fig. 12 is a schematic diagram of a system which uses an apparatus of the type shown in Fig. 11 in which the signals are of conventional length, but in which a sixth impulse is incorporated with the stop interval and the start impulse is varied to contrast with the stop impulse; and Fig. 13 is a diagrammatic chart of a code signal such as may be used in the system disclosed in Figs. 11 and 12 showing how its component parts are functionally allocated.

In illustrating the preferred embodiment of the present invention, Figs. 1 to 4, a type wheel page printing machine is used whose selector shaft is maintained in a vertical position, and at whose upper extremity is carried a cylindrical type supporting wheel having individually movable printing pallets. This type wheel indicated 11 is provided with four annular rows of type pallets 12, each pallet of which is radially slidable within its own confining groove, and each annular row of which is retained and urged towards the concentric center of the wheel by a garter spring 13. A cylindrical printing platen 14 is journaled upon a supporting shaft 15 and is shiftable endwise step-by-step in one direction in response to printing operations, and totally in the other direction in response to a carriage return signal in a manner well-known among page printing machines.

The platen 14 is supported in a carriage generally indicated 16 which may itself be supported and confined by antifriction rollers 17 confined between the trackways 18 and 19. In front of the printing platen 14, there is indicated a printing ribbon 21, the location of which, with respect to the periphery of platen 14, is indicative of the printing locus and, accordingly, denotes the level at which each row of printing pallets must be aligned in order to present it into printing engagement with said platen 14.

The type wheel 11 is integrally associated with a supporting collar 22, and is splined to rotate with the type wheel shaft 23 but free to be shifted longitudinally thereof together with its collar 22. This longitudinal shifting of type wheel 11 is executed through engagement of a shifting frame 24 whose horizontal bar 25 is slotted as at 26, Fig. 2, to straddle and be received within the groove 27 of collar 22. For purposes of steadying the shifting frame 24, its bar 25 is provided at remote ends with yokes 28, Fig. 2, of which one is visible in Fig. 2, and which is indicated thereat 28 straddling the supporting column 29, parts 28 and 29 being duplicated at the opposite end of bar 25, but being broken away in the limited disclosure of Fig. 2.

Figure 1:
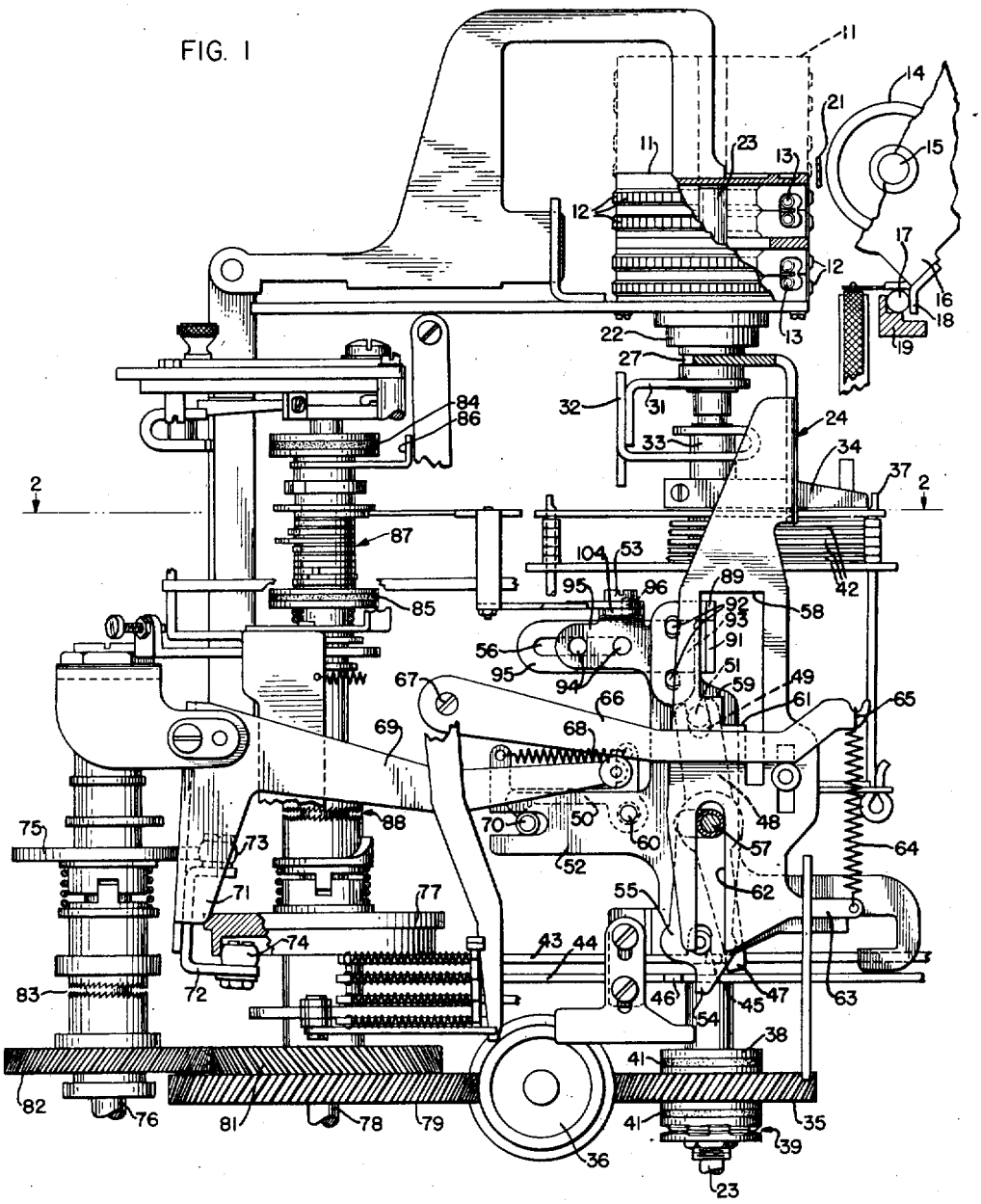
Fig. 1 is a vertical sectional view through a printing telegraph apparatus, such as that featured in the copending application mentioned above, having incorporated therein the improvements which exemplify one embodiment of the instant invention.

Collar 22, Fig. 1, is prevented from rotating with respect to shaft 23 by the interengagement between its slide engagement coupling bar 31 with that 32 of a selector arm sleeve 33. Because of the tongue and groove engagement between arms 31 and 32, type wheel 11, together with its collar 22, may be shifted longitudinally, without disengagement of driving connection between said elements 31 and 32, but permitting, nevertheless, of axial shifting of the type wheel and its associated elements throughout a distance sufficient to elevate the type wheel to the dotted outline position (of Fig. 1) while still maintaining the driving and driven relationship between the selector arm sleeve 33 and the type wheel 11.

Sleeve 33 and its integrally associated selector arm 34 are bound to the shaft 23 so as to rotate with it under impetus of the driven gear wheel 35 which maintains meshing engagement with the motor driving worm 36, but because selector arm 34 may be obstructed by one or another of the plurality of selectable pins 37, the assembly, including shaft 23, may thereby be arrested at any one of several radial positions corresponding with the several selectable pins 37. In passing, mention is made of the scant showing of a selector pin assembly in Fig. 1. Actually this apparatus consists of possibly thirty-two pins 37 all similarly held and the several closely placed in a circular group about shaft 23 as a center. The single pin 37 illustrated in this figure denotes the relative position, but the others of the selector pins as well as certain supporting apparatus has been eliminated from view in order to render more clear for observation that mechanism which is directly concerned with the present improvement.

When shaft 23 is so arrested, driven wheel 35 may continue to rotate, but slippage is permitted between the latter and its adjacent driving discs 38 and 39 because of the intervening slip washers 41, fibrous elements which are tensioned between the adjacent surfaces of gear wheel 35 and said discs 38 and 39. As explained in greater detail, in the above referred to copending application, the rotary drum selector which includes the above-mentioned selectable pins 37 is designed to accommodate a five-unit code having as its essential selector apparatus five circular discs 42 whose peripheries are provided with a notch and lug distribution, so that upon each permutative placement of the several discs 42 an individual clearance is afforded to one of said several selectable pins 37 which, when that occurs, moves inwardly to present its upper extremity, Fig. 1, into the path of rotatable arm 34, blocking the further progress of said arm and through it the rotation of shaft 23.

This selection, arresting shaft 23 in any of thirty-two rotary positions, may not only serve to align a corresponding printing lug 12 for subsequent printing operation, but also, because shaft 23 is a carrier of other selecting apparatus, it may serve to condition special function operating members as more fully described in said copending application. Of these special functions, certain ones only are concerned in the instant disclosure, and these will be identified as the two primary case shift functions; namely, the conventional upper and lower case shifts. In Fig. 1, the two selectable bars which execute these case shift functions are illustrated in the lower portion of the figure by the reference numerals 43 and 44, the former having a sidewardly extending lug 45, and the latter a similar lug denoted 46.

The apparatus now described is that which, in response to the two conventional case shift signals, exercises a part supervision in determining the extent of vertical shifting of the type wheel 11. The copending application referred to explains how, in response to the conventional case shift signals, bars 43 or 44, depending upon which of the two signals is received, rotates about a pivot located at its left extremity, Fig. 1, so as to present one or another of the lugs 45 and 46 forwardly. When bar 43 is thus selected and its lug 45 moves forwardly, there follows towards the conclusion of its selection cycle a rightward movement of all of the bars, including 43 and 44, so that lug 45 being the only one in extended position, is made to engage the lowermost extremity 47 of a shifting lever 48 whose opposite end being provided with the open slot 49 and straddling the stud pin 51 of case shift plate 52 causes the latter to be moved leftwardly or into the position illustrated in Fig. 1. The immediate significance of this movement is its characteristic placement horizontally of the anchor pivot 53, see also Figs. 3 and 4, but a further consequence of this operation will be discussed later.

Alternatively, upon the selection of the other shift bar 44 and the consequent movement of its lug 46 into the path of the lowermost extremity 54 of lever 55, there results the movement of case shift plate 52 rightwardly to an extent of movement as denoted by the elongated hole 56 and the consequent restoration of case shift lever 48 to its first position, since the two levers 48 and 55 are articulated to the common pivot shaft 57, each serving to restore the other upon its selection. The result of the operation of lever 55 so far as the specific contemplation is concerned is in the movement of said pivot stud 53 rightwardly for a purpose to be discussed later.

Pivot screw 53, which has already been introduced above, constitutes a critical center and pivot support for an important element in the shift mechanism, namely, bell crank 101—102, about which more will be said later. Moreover, this key pivot is anchored in a sidewardly extending shelf 104, Figs. 3 and 4, which is integral with the shift plate 52 whose progress from side to side is governed by the selectable levers 43 and 44 as just described. When either of its alternative positions is established, shift plate 52 is thereat detained by the action of a spring loaded detent lever 50 which is pivoted to the plate 52 at 60 so as to urge with its V-shaped extremity against one side or the other of a fixed rod 70. When moved to its opposite position from either, lever 50 is cammed about pivot 60 through cooperation of its V-shaped nose and said rod 70.

Referring now again to the vertical shifting frame 44 which carries with it the type wheel 11, it will be noted that its side wall, Fig. 1, contains an irregular aperture 58 whose lower edge provides two shoulders or steps indicated 59 and 61 seen also in Figs. 5 to 8. The movement of frame 24 is maintained in a parallel vertical direction not alone by the aforedescribed alignment studs 29 but also because of shaft 57, one end of which is rigidly anchored in the framework and the surrounding roller sleeve carried by said shaft fits closely within the confining slot 62 of framework 24. The frame 24 is lifted by means of an integral ear 63 to which is connected a comparatively stout but nevertheless yieldable lift spring 64, having an upper loop which is suspended from the hooked extremity 65 of a lifting lever 66 pivoted at 67 in a stationary portion of the printer structure.

Lever 66 is of the third class type since the lifting force is applied thereto at an intermediate point in its length by means of a roller 68 which is carried at the end of one arm 69 of a bell crank lever whose other arm 71, having an integrally associated bracket 72, carries two rollers 73 and 74. Of these, roller 73 is actuated by the periphery of an initially effective operating cam 75 carried upon the auxiliary shaft 76 while roller 74 is confined within the trackway of a side channel cam 77, the two cams functioning jointly in a manner fully described in said copending application.

Auxiliary shaft 76 and the principal control shaft 78 receive their power from drive worm 36, which is carried by the motor shaft, through a gear train which includes the primary diven gear 79, a driving gear 81 integral therewith and a secondary driven gear 82 carried by shaft 76 and meshing with the just described driving gear 81. Cam 75 is dependent for rotation upon tooth clutch 83, a positive saw-tooth driving coupling which is brought into driving engagement under the supervision of a trip lever initiated by a cam carried upon the upper end of shaft 78, said cam being part of a driven sleeve described in greater detail in said copending application, and dependent for rotation upon the friction clutch comprised of the two discs 84 and 85, the assembly of cams 87 being free to rotate upon the release of stop arm 86. Shaft 78 rotating at all times under the influence of driving worm 36 imparts rotation to its associated apparatus only upon the release of friction clutches 84 and 85 to impart rotation to the cam assembly 87 and through the teeth of clutch 88 to impart rotation to the aforedescribed cam 77.

Figure 5:
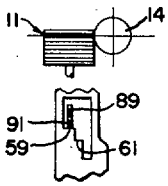

Though type wheel shifting frame 24 is lifted to variable extents by arm 66, spring 64 and bell crank 69 as just described, the degree of movement on the part of the lifting levers is always the same. The extent of rise on the part of type wheel 11 is determined by the position of a pair of stop lugs indicated 89 and 91, Figs. 1 and 5 to 8, which lugs are capable of being variously arranged so as to engage one or the other of the stop shoulders 59 and 61 already described. It will be observed that lug 91 is the lowermost one and also that it is substantially wider than is the upper lug 89. When both lugs 89 and 91 are in the leftward position as indicated in Figs. 1 and 5, then a condition obtains whereat type wheel 11 will be permitted to rise only to an extent which will align its upper row of characters 12 in printing position opposite the platen 14 and printing ribbon 21.

Figure 6:
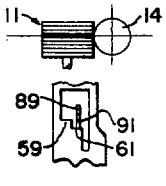

Correspondingly, when both lugs 89 and 91 are moved into the intermediate position, engagement by shoulder 61 will be had permitting the type wheel 11 to rise until its second row of characters 12 will be brought into printing position as shown in Fig. 6. When lug 91 is moved to the extreme right so as not to be engageable by either of the shoulders 59 and 61 and when under this condition lug 89 is permitted to assume its left-hand position such as viewed in Fig. 7, then the type wheel 11 is permitted to rise until its third row of characters 12 is brought into printing alignment. Finally when with lug 91 still at the extreme right and the upper lug 89 is brought into the intermediate position, type wheel 11 may be permitted to rise in response to the lifting apparatus until the lower or fourth row of characters 12 is brought into printing alignment as shown in Fig. 8.

There will now be recited a description of the apparatus which, in response to line signals, controls the disposition of the lugs 89 and 91 to effect the four designated case shift conditions which will be referred to for convenience as the first, second, third, and fourth shift positions in an order corresponding to the aforerecited description and also to correspond with Figs. 5, 6, 7, and 8, respectively.

Figure 3:
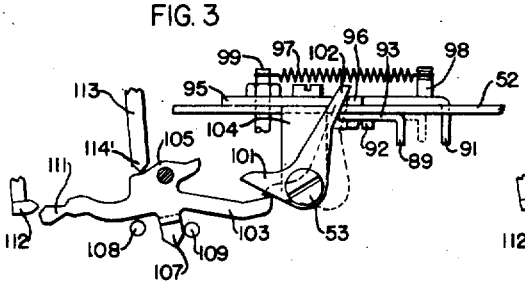
Figs. 3 to 8 are detailed views of the case shift determining apparatus featured in Figs. 1 and 2.
Figure 4:
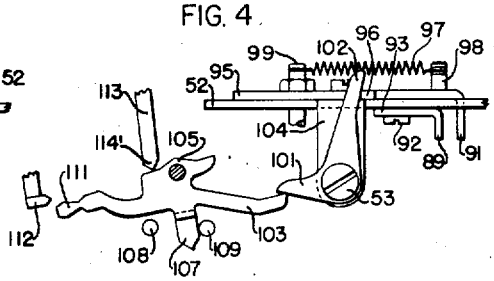

Shift plate 52 is threaded to receive two stud screws 92, the latter being preferably of the shoulder screw type with neck portions of sufficient length to be able to receive and support thereat the main body portion 93, Figs. 3 and 4 of lug 89. Also threaded into plate 52 are a pair of shoulder screws 94 whose necks are of sufficient length to support freely the body portion 95 of lug 91 which member includes also an upwardly extending projection 96, Fig. 1. A tensioning spring 97 having one end looped around an anchor post 98 integral with member 95 and its other end loop secured to the anchor post 99 which extends from a stationary part of the machine, tends to urge lug 91 and its main body portion 95 toward the left as viewed in Figs. 1 and 5 to 8. This influence is overcome selectively through the instrumentality of bell crank member 101—102. One arm 102 of said bell crank engages the aforedescribed upstanding lug 96 of member 95, while its opposite arm is engaged by a lever arm 103 under conditions which will now be described. Bell crank 101—102 is pivotally supported by screw 53 which, it will be recalled, is carried by the shift plate 52 and particularly in a horizontally extending platform 104 thereof.

Figure 2:
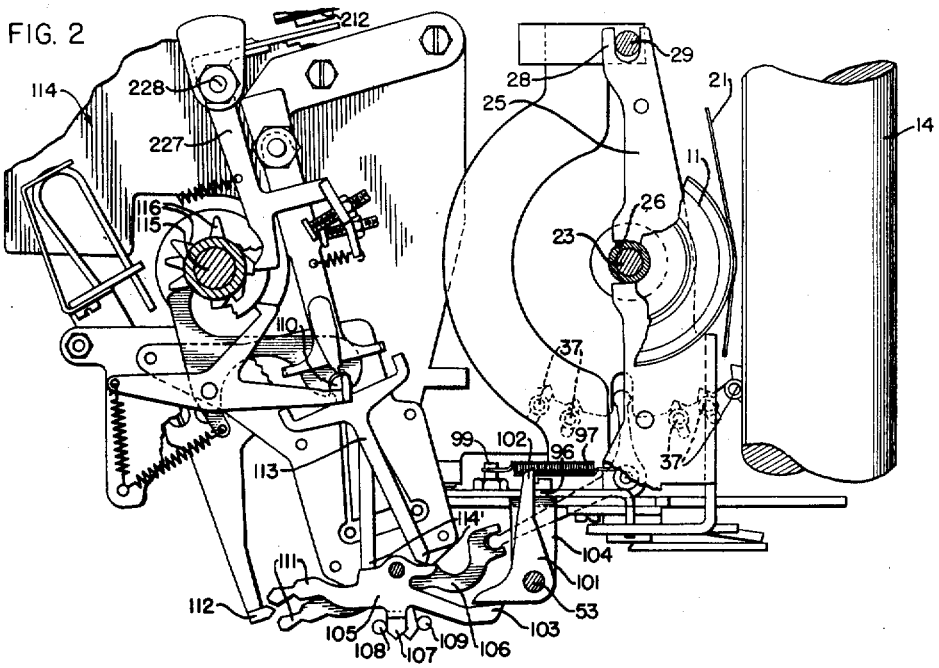
Fig. 2 is a plan sectional view taken approximately on line 2—2 of Fig. 1.

A lever 105 of which arm 103 is an integral portion constitutes one of a set of six storage members indicated in Figs. 2, 3, and 4. Of the set, however, lever 105 is the only one having the configuration indicated, the remaining levers 106 being similar to each other but differing in contour as may be noted in Fig. 2. Certain common characteristics of all of the levers 105 and 106 include their alternatively selectable positions determined by the engagement of their stop projection 107 with one or the other of a pair of limit pins 108 and 109, and their latch arm 111 through which they may be retained in one or the other of their alternative positions by a locking bail 112. When latching or locking bail 112 is withdrawn, as illustrated in Figs. 2 to 4, which is its condition during a brief signal transfer interval, each lever 105 and 106 is capable of assuming either one or the other of its alternative positions and, in response to a received code combination signal, a corresponding set of conditions is imparted to the set of levers 105 and 106 by means of a set of positioning swords 113, flat steel members with blunt extremities 114, and universal connection discs 110. Beyond this point, the selector mechanism generally indicated 114 is the same in structure and operation as that disclosed in the aforementioned copending application, save that whereas the distributor cam assembly 115 in the instant apparatus is provided with six setting cams 116, the copending disclosure contemplates but five.

While all of the general class of storage elements 106 are capable of assuming one or another of the alternative conditions in accordance with the conventional operation of printing telegraph apparatus, lever 105 having particular significance to the present invention may also assume a right or a left position in accordance with the setting it receives from its associated sword 113. The illustrations in Figs. 3 and 4 show lever 105 in the counterclockwise position; that is, with its lug 107 abutting the right side stop pin 109. The opposite or left-hand position of member 105 is indicated in Fig. 2. With a given setting or presentation of pivot screw 53, it will be understood that the alternative positions of lever arm 103 may be made to effect alternative positioning of bell crank 101 and through it, in turn, to cause to be shifted through upstanding lug 96 the horizontally shiftable body portion 95 of shift controlling lug 91.

Figure 7:
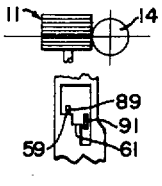
Figure 8:
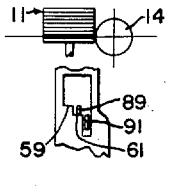

Accordingly, with lever 105 in its spacing condition, as illustrated in Figs. 3 and 4, bell crank 101 is maintained in its clockwise extremity with arm 102 urging against the upstanding lug 96 and maintaining body portion 95 so that lug 91 seeks to achieve its right-hand extreme position, as illustrated in Figs. 7 and 8. This condition prevails so long as selector 105 is in its spacing condition notwithstanding the two possible conditions of shift plate 52. However, when pivot 53 is moved (along with shift plate 52) toward the left, Fig. 6, projection 91 may then assume an intermediate disposition as shown.

Lug 89 which is carried as an integral member of plate 52 is shiftable together with that plate so that it may assume either one of two alternative conditions as illustrated, for example, in Figs. 5 and 6. Because, however, elongated slot 56, Fig. 1, is of limited extent only, the shifting of plate 52 leftwardly as for the purpose of placing projecting lug 89 to align vertically with shoulder 59 will also modify the placement of projection 91 through the engagement of the end of slot 56 with bolt 94 so that there is obtained ultimately a condition such as that illustrated in Fig. 6. But, it is to be understood that plate 52 may exert an influence on the disposition of member 95 only when said plate 52 is moved to its extreme right-hand position and when, under the circumstances, member 95 seeks to attain its extreme left-hand position. As a result of these efforts, plate 52 will be moved to its extreme right-hand position under the influence of selectable element 43, but member 95 will be limited in its effort to achieve its left-hand position because of the restrictive nature of slot 56 which will permit said member to move leftwardly only to an extent where its projection 91 will assume the condition indicated in Fig. 6.

Recapitulating, selectable elements 43 and 44, acting through the medium of levers 55 and 48, move plate 52 and together with it the projection 89 into either of two alternative conditions, as exemplified in Figs. 5 and 6, Fig. 7 being, so far as projection 89 is concerned, similar to Fig. 5. Selectable element 105 having two alternative conditions and acting through bell crank 101, spring 97 being a return agency, is enabled to move member 95 and through it projection 91 into either of two alternative conditions, as exemplified by Figs. 7 or 8 on the one hand and Fig. 5 on the other. The intermediate condition of Fig. 6 is attained when plate 52 is in its extreme right-hand position and member 95 seeks to achieve its extreme left-hand position. As a result, member 95 is intercepted in its path of progress because of the restriction by elongated slot 56 and is permitted to move only to an intermediate position, as illustrated in Fig. 6.

It is therefore to be understood that a total of four case shift selections may be achieved in response to (1) the two standard case shift signals conventionally used for elevating a type wheel in the manner described in the copending application referred to above, and (2) an additional or secondary case shift in response to the sixth code impulse which effects corresponding positionment of the storage element 105.

*First modification*

Figure 9:
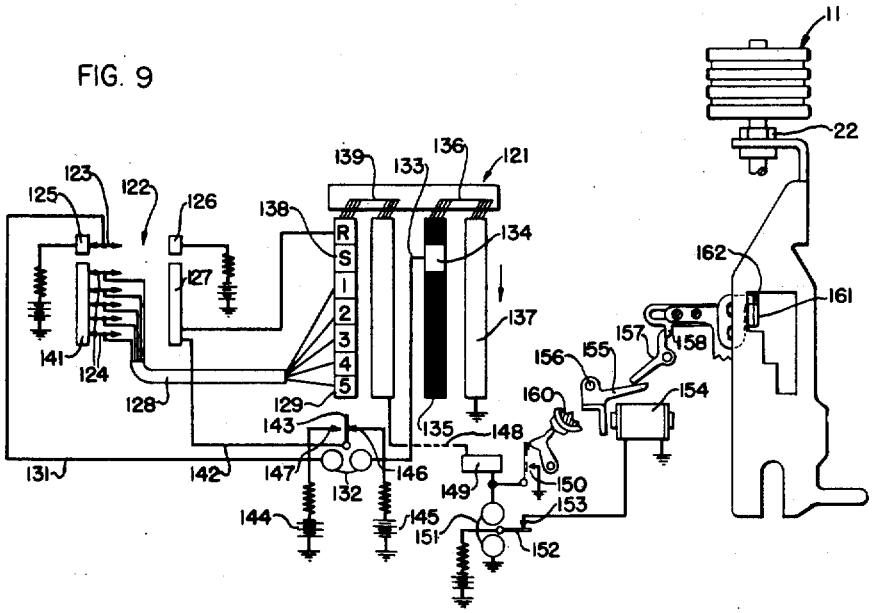
Fig. 9 is a schematic diagram of a first modification of the invention which utilized plus, minus, and no-current for signal composition with the marking impulses varying between positive and negative current characteristics for the purpose of obtaining a shift control index.
Figure 10:
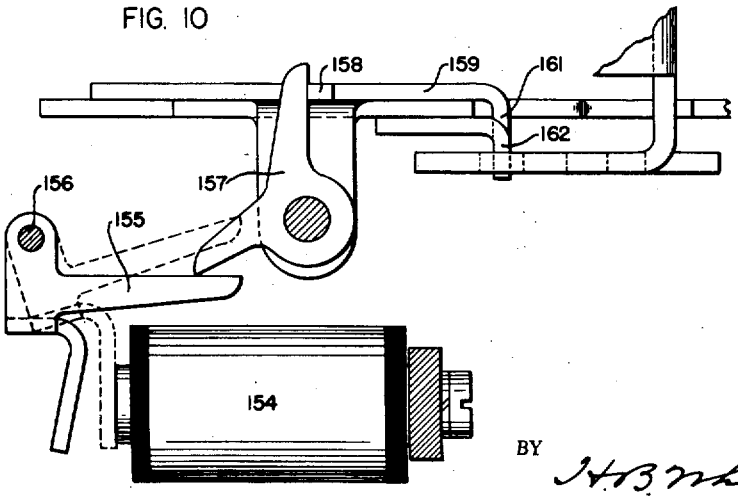
Fig. 10 illustrates a modified form of shift mechanism especially adapted for use in a system such as that featured in Fig. 9.

Figs. 9 and 10 illustrate a modified form of signal transmission system for effecting the control of a double character shift supervision (a total of four shift positions) after the manner of the preferred embodiment described generally above. Contrasting with the system already described, this modification contemplates the use of a five-unit line signal code instead of a six-unit code, the secondary shift signal characteristic being inherent in the nature of the polarity of marking impulses instead of the marking or spacing nature of the sixth pulse. It is proposed, accordingly, to make available for signal transmission both positive and negative current potential, either one of which is to be used permutatively with no-current to produce five-unit Baudot permutation code signals, but whether the marking signals are constituted of positive current or of negative current will determine the alternative characteristic of the secondary shift control.

In the diagrammatic representation, Fig. 9, the reference character 121 denotes a transmitting distributor of the rotary type which may be controlled by start-stop or multiplex (synchronous) supervision. A tape sensing unit generally indicated 122, is provided with six tape hole feelers. Five of them are committed to the five-unit signal code, and their contactors 124 are therefore associated with the five segments of the transmitting distributor 121, but a sixth one whose contactor is indicated 123, is designed to sense the presence or absence of a sixth perforation in a six-hole tape, and serves to introduce positive or negative current to the contact segment 134 which, in turn, introduces corresponding current condition to the marking signals, as will now be described.

The tape transmitting apparatus 122 may be of any conventional type, one embodiment being illustrated in U. S. Patent No. 1,661,012, except that instead of providing but five sensing levers and associated electrical contacting apparatus, unit 122 may correspond in all respects thereto so far as the conventional feeler levers 124 are concerned, special feeler 123 being simply an additional member and having an additional pair of contacts with separate contacting points represented by the rectangles 125 and 126. The cable 128 contains five lines, each connecting one of the feeler lever contactors 124 with its associated segment in distributor ring 129. A conductor 131 connects special feeler contactor 123 with one terminal of the winding of a polar relay 132. Continuing from the other terminal of polar relay 132 is a line conductor 133 leading to a special segment 134 of a distributor ring 135 adapted to be bridged by a pair of brushes 136 with the grounded ring 137.

It is to be noted that the aforementioned segment 134 aligns with and corresponds to the distributor cyclic period coincident with the conventional start segment 138 of distributor ring 129 and that this cyclic interval is in advance of the first one of the five permutation code segments of ring 129. For this reason, it will be observed, the operation of relay 132 will occur in advance of the time that brushes 139 encounter said permutation code segments of ring 129. Thus, the transfer operation on the part of relay 132 is made to occur during a no-current interval of the line conductor 148 (segment 138 having no connection with any of the feelers) and there is in this way prevented the possibility of foreshortened or clipped impulses, a result which might not be avoided save through the utilization of a neutral interval during which to exercise the current reversal.

The normal position of tape feelers and their associated contacts 123 and 124 may be supposed in the manner illustrated in Fig. 9; that is, with their contacts engaging terminal blocks 125 and 141. Accordingly, when presented against the surface of the tape, said contacts 123 and 124 seek to engage the contact blocks 126 and 127, those encountering perforations being permitted to do so and accordingly connecting their respective segments of ring 129 with block 127 which, in turn, receives current potential over a conductor 142, contactor 143 from one or the other of a pair of opposite current sources 144 and 145. Those not encountering such perforations, however, will, during the critical portion of the signal transfer, fail to obtain current and hence cause to be conditioned their respective segments of ring 129 without electrical potential or with "no-current."

Relay 132 being of the polar type as already mentioned, its armature 143 will move to the right or to the left engaging the contact points 146 or 147 in accordance with the nature of current coming over conductor 131 from contactor 123 which may engage positive current block 126 or negative current block 125. When placed in either of its positions, armature 143 remains until altered by an opposite polarity introduced into the windings of its relays 132. Accordingly, it will be understood that the presence or absence of a sixth perforation will correspondingly impress block 127 with positive or negative current and that on this account, permutation code signals generated over the segments of ring 129 may be either positive and no-current or negative and no-current and that they will accordingly be issued out over line conductor 148.

At the receiving station, there is connected to line conductor 148, in series, the selector magnet 149 and a receiving polar relay 151 whose armature 152 will engage or withdraw from its contact point 153, depending upon whether the marking impulses of the received signals are of positive or negative polarity. In accordance with the movements of armature 152, operating current will be introduced to or withheld from the winding of the secondary shift control relay 154, over an obvious circuit, Fig. 9.

A bell crank armature 155 pivoted at 156 and responsive to the energization or nonenergization of relay 154 actuates an intermediate bell crank lever 157, resembling in appearance and operation the bell crank lever 101 discussed in the preferred embodiment above. The actual relationship and position of bell crank lever 157 is as illustrated in Fig. 10, whereat its vertically extending arm engages a projection 158 integral with the horizontally shiftable bar 159 whose interponent lug 161 corresponds in appearance and operation to the lug 91 of the preferred embodiment.

Bar 159 will be supported in the same manner as bar 95 of the preferred form; that is, by a shiftable plate, such as plate 52, and will be capable of responding in the same manner as the other member. Likewise, a lug 162 corresponding to the described lug 89 will be provided and will also be carried by said shiftable plate, the two lugs 161 and 162 to function under the control of bell crank 157 in a manner and for the purpose already described in the preferred embodiment.

Since the operation of secondary shift control magnet 154 by the current characteristics as aforedescribed need not be established except during any one impulse of a signal, and since the most favorable opportunity for executing the performance (energization or release) of said magnet 154 is coincident with the stop (R) impulse interval, means have been provided for shunting the supervisory polar relay 151 so that it may not fluctuate except during the precise interval coincident with the stop signal impulse. This supervision is exercised by a special cam carried upon the distributor shaft 160 which, acting through a follower lever, causes the contact pair 150 to come ajar during the distributive interval coincident with the stop impulse, thereby removing the shunt ground from a local circuit as shown in Fig. 9 cutting into circuit relay 151 together with magnet 149 and permitting both members to respond to the stop impulse. At all other times in the distributive cycle, however, the apex of said cam of the distributor shaft 160 is withdrawn from the follower lever permitting contact pair 150 to engage and to thereby effectively shunt relay 151 out of the signal responsive circuit.

It is to be understood, therefore, that the modified showing of Figs. 9 and 10, illustrates another manner of controlling the functioning of a secondary shift control structure but, in this case, under the supervision of a five-unit code instead of a six-unit code as contemplated in the first described system. A shift characteristic for the purpose of supervising a secondary type wheel shift function has been embodied into the standard five-unit code by alternating the current characteristic of the marking impulses between plus and minus, the spacing impulses being in all cases no current.

*Second modification*

In Figs. 11 and 12, there is illustrated a further system of printer control and line transmission for utilizing the five-unit Baudot code signal in such a manner that it will afford six-unit signaling possibilities. Other manners of accomplishing this result have already been disclosed in connection with the embodiments described above, as by providing means for supplying two current conditions for the marking impulses.

In the manner of signaling contemplated in connection with the present embodiment, there is employed a five-unit Baudot type code combination signal having, in addition to the conventional five selective impulses, a special impulse utilized for supervising secondary shift control and a start impulse interval of a polarity opposite to that of its preceding or special impulse interval, under the specific contemplation of the five code combination impulse interval.

In other words, whereas conventional five-unit permutation code signals being provided with seven componential impulse intervals contemplate start and stop impulses of predetermined and invariable line characteristics, means are herewith provided for varying the characteristic of the stop signal interval so that it may have utility for selection as well as phasing supervision and for making the start initiating apparatus responsive to a start impulse condition of electrical polarity opposite to that of the immediately preceding stop impulse interval which, as has been said, may consist of either one of two alternative line conditions.

In the incorporation of this plan of operation, it has been found expedient to utilize plus and minus current conditions to represent marking and spacing instead of the conventional practice of utilizing current and no current conditions for this purpose. Moreover, as in the case of the first modification, Figs. 9 and 10, there will be utilized for the purpose of signal translation a six feeler sensing apparatus generally indicated by the reference character 171. Reader mechanism 171 is illustrated as having seven contactors 172 to 178; however, contactors 177 and 178 both are carried upon a single feeler lever while each of the remaining contactors 172 to 176, inclusive, is carried individually upon a feeler lever.

In accordance with the operation of its feeler lever, each contactor is spring urged so that it will engage the contact block towards the right and is capable of movement in an opposite direction so as to engage the contact block towards the left, as illustrated in Fig. 12. The contact block at the right is comprised of a large section indicated 179 and a smaller section insulated therefrom indicated 181. The contact block at the left is similarly comprised of two sections, the larger one indicated 182 and the smaller one 183. Moreover, as may be noted the small contact block 183 is connected electrically over an obvious conductor with the large contact block 179 and correspondingly small contact block 181 is connected electrically with the large contact block 182. Opposite sources of grounded potential indicated 184 and 185 are connected respectively to the contact blocks 183 and 181 over conductors 186 and 187 to the oppositely placed contact points of armature 188 under the control of a polar relay 189.

The winding of said relay 189 is connected at one end to the aforedescribed feeler contactor 178 and at its other end to a distributor segment 191 situated in distributor ring 192. This distributor 196 which includes also distributor rings 193, 194, and 195 is of the start-stop type having a brush carrier 197 which supports two pairs of bridging wipers 198 and 199. Brush carrier 197 of transmitting distributor 196 is conventionally illustrated in Fig. 12, but it is to be understood that this element is driven through a friction coupling preferably in a rotary direction and that it may be restrained from movement by the intervention of an armature 201 under the supervision of start magnet 202. Also, that the pair of wipers 198 serve to connect segmented distributor ring 193 with the solid distributor ring 194 which is electrically connected to line conductor 203, and that the pair of wipers 199 correspondingly connect distributor ring 192 which contains the segment 191 aforedescribed with the grounded distributor ring 195.

Attention will now be given to distributor ring 193 which, as may be observed in Fig. 12, is made up of seven segments. When the brush carrier 196 is in its arrested position, wiper 198 is contacting the slightly longer segment designated 5 in the distributor ring 193. Also, it may be observed that following the segment 5 which serves also in the capacity of a stop segment as will later be described, there is encountered a start segment designated by the character S.

Following this segment is one designated 0 (zero), when has been arbitrarily assigned to the function of supervising the secondary shift. This control is otherwise executed, in accordance with the present embodiment, in a manner generally similar to that described above in connection with the preferred embodiment.

The remaining segments 1, 2, 3, etc., including segment 5, which as has already been stated, functions in a dual capacity, serve to distribute those signal impulses which relate to the composition of the permutation code. Segment 5 is connected over a conductor 204 to the feeler 177. Segment S is connected over a conductor 205 to the armature 188 of polar relay 189. Fig. 12 illustrates diagrammatically transmitting station equipment including a perforated tape controlled mechanism and a rotary signal transmitter under the supervision thereof for issuing signals of a type adapted to exercise the control function including primary and secondary shift supervision for printing apparatus having mechanically the characteristics exemplified in the showing of Fig. 11.

As the brush carrier 197 proceeds in the downward direction as indicated by the arrow 200, the pair of wipers 198 leave segment No. 5 and encounter segment S bridging this element of distributor ring 193 with the solid line ring 194. Assuming, for the sake of illustration, that the perforated tape signal which has just been positioned and which has been impressed upon the feeler levers of record reader 171 is such that contactors 177 and 178 (which operate in unison) are moved to the right, that is to say, with contactor 177 engaging block 179 and contactor 178 engaging block 181, distributor segment No. 5 will have received positive current potential from grounded battery 184 over conductor 204. This circuit is traceable from positive battery 184, segment 183 to segment 179, feeler 177, conductor 204, segment No. 5 of distributor ring 193, brushes 198 to outgoing line ring 194 which is grounded at the receiving station. As the brushes proceed to the next segment which is designated S, opposite polarity is issued from grounded battery 185 if polar relay 189, in accordance with its preceding operation, has been left in a position whereat its armature 188 engaged the contactor of conductor 187. This circuit is traceable from negative battery 185, conductor 187, armature 188, conductor 205, segment S of distributor ring 193, brushes 198 to line ring 194.

If instead of the supposed example described above, the particular signal had been one in which the feeler lever with which contactors 177 and 178 are integrally associated was positioned to the left causing engagement with contact block 182 and 183 instead of contact block 179 and 181, the electrical characteristics relative to segments 5 and S would be opposite to that just described. With the brushes 198 passing over segment 5 negative potential would be supplied from grounded battery 185, segment 181, segment 182, feeler 177, over conductor 204 to segment No. 5. Likewise, positive current would be supplied from grounded battery 184, conductor 186, armature 188 of polar relay 189, which has been energized to its opposite position, conductor 205 to segment S of distributor ring 193. Each of the feeler contactors 172 to 176, inclusive, is connected over an individual conductor with an associated segment 0 (zero) to 4 of the transmitting distributor ring 193. Accordingly, when a feeler lever encounters a perforated position in the tape, its contactor will be moved into one position, say the right-hand one, engaging the contact block 179 while its said feeler lever encounters a nonperforated position and its contactor will assume an opposite condition; that is, contacting the opposite block 182. The designation of plus or minus signals to correspond with perforated or nonperforated signal components is arbitrary, and it is to be understood that the reverse association is equally feasible.

The foregoing is true not only of the conventional five feeler levers of contactors 172 to 176, but also of the special feeler lever with which are associated two contactors 177 and 178, as has already been mentioned. One significant difference, however, does prevail which will now be noted. In the case of the special or sixth feeler lever, when a perforation is encountered and, say both contactors are moved to the right, contactor 178 will be introducing negative current from battery source 185 to the winding of bias polar relay 189 while contactor 177 will be introducing positive battery from source 184 over conductor 204 to the stop segment 5. Conversely, with the contactors 177 and 178 in the opposite position, that is, engaging contacts blocks 182 and 183, positive current originating from source 184 will be introduced through feeler 178 to the winding of bias polar relay 189, while negative current originating from source 185 will be introduced over conductor 204 to stop segment 5. Accordingly, since armature 188 of relay 189 is connected to the start segment S, the result of the operation of the sixth or special feeler lever will be understood as one controlling the reversal of potential for start segment S, that is to say, with a given condition on the part of segment 5 which may be either plus or minus the sixth feeler lever controlling contactors 177 and 178 operate to provide an opposite current potential to the start segment S.

The purpose in having provided polar relay 189 with its armature 188 connecting plus or minus current to the segments instead of directly connecting the contactor 178 to said segments is one of permitting the start impulse signal interval to be stored. The transmitter utilized is of the well-known magnet type wherein a new signal is sensed during the start interval. If a new signal should be sensed which would cause the feelers 177 and 178 to move to their opposite position the start impulse would be of the same polarity as the stop impulse. However, by providing the polar relay 189, the armature 188 will be held in a position whereby potential opposite to that of the stop segment 5 will be assured, as the armature 188 retains such position until the brushes 198 have passed the start segment S, or until brushes 199 sweep across segment 191 of ring 192, thus providing a grounded circuit for the polar relay 189. At this time the armature 188 may move to the opposite side if the feelers 177 and 178 have moved, but the start impulse has already been transmitted.

In Fig. 12, the reference character 206 designates a receiving station and within said outline are contained the symbols representing vital apparatus responsive to the signals generated by the transmitting distributor 196. Of these, the reference character 207 denotes a bias polar relay whose armature 208 is grounded, and is adapted to reciprocate between two contact points 209 and 211 which are part of a local circuit for supervising the operation of principal control magnets 212, see also Fig. 11.

Also situated in said receiving station local circuit are a pair of contactors indicated 213 and 214. The former reciprocates between a pair of contact points 218 and 219 and the latter between a pair of contact points 215 and 216. In the printer apparatus which is shown in mechanical detail in Fig. 11, contactor 214 and its associated contact points 215 and 216 are indicated as an assembly controlled by a follower arm 221 pivoted at 222 and supervised by a cam apex 223 which is one of an assembly carried upon the distributor cam shaft 78, see also Fig. 1. Also carried on shaft 78 as an integral part of the aforementioned cam assembly and in addition to the aforedescribed cam having the apex 223 are five selector signal cams whose apices actuate the five bell crank levers 224 mounted in pivotal alignment upon shaft 222 and hence affording visibility only to the foremost ones in Fig. 11.

A sixth cam similar to said five distributor cams is utilized for the purpose of actuating the storage lever 105 which is similar to the one described in connection with the preferred embodiment above and which actuates in a similar manner a bell crank 101 for the purpose of obtaining the referred to secondary shift control. In addit'on to the cams already designated in the assembly carried by shaft 78 is one indicated 226, having a plurality of spaced apices, which when said cam assembly is rotating, serve to rock the armature bell crank 227 about its pivot 228 for the purpose of presenting its magnetically attractive arm 229 against the polar face of magnet 212. This operation of cam 226 in assisting the armature 227 and thereby diminishing the work of magnet 212 is in accordance with recognized practice in printing telegraphy.

As illustrated in Fig. 11, storage lever 105 is disposed below the other storage levers 231 and 232. This arrangement is in a general sense arbitrary for the shift signal impulse, in the particular instance corresponding to the segment 0 on the distributor ring 193, Fig. 12, may be located if preferred in any other position with respect to the componential sequence both in the distributor ring 193 as well as in the stack of selector storage levers, Fig. 11, designated 105, 231, and 232. Storage levers 232 are five in number corresponding to the signal components which utilize the segments 1, 2, 3, 4, and 5 in the transmitting distributor ring 193. Storage lever 231, together with the top one of levers 232, correspond to the code signal impulse occupied by the segment 5, and in the order designated each impulse ultimately serves to place its associated lever 231 or 232 in one or another of its two possible positions as already described in connection with the preferred embodiment.

For the purpose of understanding the principles of the instant improvement, it will suffice to state that ultimately the storage signal is manifest by a conditioning of the several storage levers 105, 231, and 232 with the lever 105 exercising the function of controlling secondary case shift bell crank 101 and levers 232 functioning to condition the set of code discs 234 which are five in number.

Storage lever 231 controls the shifting of abovementioned contactor 213. Accordingly, when it is found in the position as illustrated in Fig. 11, it permits contactor 213 to engage its upper contact 219, and when it is in an opposite condition such as that occupied by the counterclockwise extreme storage lever 232, in Fig. 11, said lever 231 by its protuberance 235 will engage the insulated extremity of contactor 213 and thrust the latter member so that it will disengage contact 219 and engage contact 218 instead.

A supervision of contactor 214 is had by follower lever arm 221 under the control of cam apex 223, that is, when apex 223 is in the position indicated, contactor 214 is thrust against its left contact 215 but at all other times, that is, when apex 223 is clear of the follower arm 221, contactor 214 is permitted through its own spring tension to recede from contact point 215 and to engage instead contact point 216. There will now be described the effect of the supervition of contactors 213 and 214 by the above-described apparatus.

Let it be assumed for the sake of illustration that a particular code signal transmitted over distributor 196 is comprised of a certain combination of code impulses whose fifth component (three being a total of six components including 0) is constituted of marking characteristics, that is, the current characteristic which will position its sword 233 in the manner indicated in Fig. 11 so as to place storage lever 231 in the position indicated in this illustration. Accordingly, contactor 213 will be permitted to recede from contact point 218 (assuming that a preceding signal differed in respect to this signal component) and to engage instead its contact 219. This will correspond also to the placement of contactor 214, as illustrated in Fig. 12. In order to produce this result, the nature of the signal impulse will be such as to effect the polar relay 207 to cause it to move its armature 208 to engage contact point 209 so as to open the circuit for selector magnet 212 and to cause the armature 236, Fig. 11, to assume its marking position. Subsequently, there will follow the start signal impulse whose effect upon relay 207 will be opposite to that just described in connection with the No. 5 signal impulse, which reversal is assured by the apparatus of the transmitting distributor described above. In consequence, relay armature 208 will be moved counterclockwise to engage its contact point 211, as illustrated in Fig. 12 closing the circuit for energizing selector magnet 212 and thereby releasing the selector apparatus for a given cycle.

Under the alternative condition of operation, that is, with the No. 5 impulse being of spacing nature, contactor 213 will be withdrawn from contact point 219 and thrust into engagement with contact point 218 instead. As described in said copending application, referred to above, cam shaft 78 carries in addition to the aforedescribed operating cams 223 and 226, a spiral distribution of cam apices indicated 230, five in number. Each one of these is related to one of the signal impulses 1 to 5, inclusive, whose corresponding segments appear in the distributor ring 193, Fig. 12, while the final one of said series specially designated 230A, Fig. 11, is, in accordance with the present embodiment, of double width.

This is so because unlike the other of the cams 230 which serve to actuate but a single one of the claw levers 224, it alone actuates a pair of said claw levers 224. Since said levers 224 are all of the same contour, they may not be differentiated in the showing of Fig. 11, however, on account of the spiral arrangement of said cams 230, each claw lever 224 will be operated at a particular cyclic interval, except said two claw levers 224 which are operated in unison by the special apex 230A. Each claw lever is provided with a sword 233 but the sword which is associated with the anterior lever 224, as viewed in Fig. 11, has been specially designated 233'. Each sword 233 and 233' terminates with a blunt point projection which rests against one side or the other of a hump 238 of an intermediate lever element, five of which are designated 232 but the one related to the sword 233' of which is designated 231. The five similar levers 232 each are provided with a tail piece 239 that serves as a locking projection by being placed on one side or the other of a locking bail 241, which member assumes the position indicated in Fig. 11, except during a brief interval following the conclusion of a particular signal when its lever arm 242 is released by the operation of the aforedescribed auxiliary shaft 76.

Accordingly, while the several swords 233 and 233' may assume one position or the other as its abutment 243 or 244 encounters the downwardly extending vane 245 or 246 of armature 236, levers 231 and 232 may not be correspondingly positioned until said swords 233 and 233' are thrust downwardly by the clockwise movement of the claw levers 224, which movement is urged by their individual springs 247 as well as by auxiliary individual springs carried upon an integral extension of lever arm 242.

The auxiliary springs of lever arm 242 are not shown in Fig. 11 of the accompanying drawings, but reference may be had to the aforedescribed copending application where it is explained that their function is of an auxiliary nature and to assist the principal actuating springs 247. None of the springs 247 or the auxiliary springs mentioned may actuate their associated claw levers 224 during the time that the locking ball 241 intervenes by blocking the extending portions 239 of levers 232. However, since lever 231 is not provided with an extension 239 as are the remaining ones of the levers designated 232, its response to its associated sword 233' will occur immediately following the instant when cam apex 230A passes the follower projection of claw lever 224 which carries said sword 233'.

Thus, while the consummation of a signal transfer relating to a particular set of code impulses of any signal must await a brief interval following the fifth or stop code impulse, the actuation of contactor 213 by the projection 235 of special storage lever 231 follows immediately upon receipt of the fifth code impulse. This assures the operation of selector magnet 212 for the purpose of arresting the rotation of shaft 78 coincidentally with the signal interval corresponding to the stop or fifth code combination impulse, even though the other purpose of the particular impulse, namely, that of setting one of the code discs 234, may await its regular period of operation which, as has been said, occurs after the lapse of a brief time interval and, in fact, during the occurrence of a succeeding code combination signal.

Cam apex 223 is specially provided for the purpose of actuating the aforedescribed arm 221 which, in turn, controls contactor 214. Cam apex 223 is effective to thrust contactor 214 against its contact point 215 for a period commensurate approximately with the beginning of the stop or No. 5 code combination impulse and continuing through the start impulse S and to the 0 (zero) or shift controlling impulse. At other times contactor 213, see also Fig. 12, engages its contact point 216 for a purpose which will now be described.

*Operation of the second modification*

Concisely stated, armature 208 of relay 207 fluctuates in accordance with each signal impulse, contactor 214 being controlled by cam apex 223 rests against contact point 216 at all times except during the stop and start signal interval, and contactor 213 being controlled by the No. 5 or stop signal is moved into one or the other of two alternative positions as a result of the operation of the transfer mechanism, described above, only during the period corresponding to this impulse. Under an assumed set of conditions, in response to marking signals, both armatures 208 and 213 will be deflected downwardly, that is, to engage their contact points 211 and 218, while under spacing signal impulses, said armatures will be in their opposite position, that is, engaging respectively their contact points 209 and 219. Also, it is to be recalled that since the No. 5 impulse functions in a dual capacity of effecting the distributor stop control as well as of entering into the permutation code, each cycle must be considered as including a part of the preceding No. 5 impulse, which affects the current characteristic of the start impulse as well as of the concluding No 5 impulse, because it, together with the impulses No. 1, 2, 3, and 4, comprises the code combination of the particular signal.

Accordingly, when the No. 5 impulse of a preceding signal happens to be marking, armature 208 will be thrust into engagement with its contact point 211, contactor 214 will be thrust into engagement with its contact point 216 (on account of the operation of cam 223), and contactor 213, as a result of the transfer operation, will be moved into engagement with its contact point 218. This will complete a circuit traceable from grounded battery at 251, winding of magnet 212, conductor 252, contactor 213, and its contact point 218 with which it is then in engagement, conductor 253, contact point 211, and its armature 208 which is then in engagement with it to ground. As a result of the continued energization of magnet 212, its armature is held and the rotation of shaft 78 is arrested in accordance with the conventional operation of printing telegraph selector shafts. This condition continues until the circuit for energizing 212 is broken, which change occurs upon the receipt of a proper start impulse over segment S of transmitting distributor ring 193. The polarity of the start signal being opposite to that of the No. 5 or stop signal impulse, as already explained, causes armature 208 to be moved to engage its contact point 209 and away from its contact point 211. This interrupts or opens the circuit for magnet 212, causing the release of its armature 236 and consequently initiating the rotation of receiving distributor shaft 78 in a manner clearly described in the copending application referred to.

As distributor shaft 78 rotates, cam apex 223 rides off the projection of arm 221 permitting contactor 214 to be drawn away from its contact point 215 and to come into engagement instead with its contact point 216, meanwhile contactor 213 remaining in engagement with its contact point 218 because it can be changed only during the occurrence of the fifth impulse. As a result of the change in contactor 214 from contact point 215 to contact point 216, no effect is obtained at this time, magnet 212 continuing to be deenergized until during the course of the succeeding six signal impulses, 0, 1, 2, 3, etc., armature 208 in response to its relay 207 returns to engage its contact point 211, which response can occur only under the control of marking signal impulses.

In the event that a marking impulse is received during the 0 (zero) impulse interval, the action of one of the swords 233 upon the storage lever 105 will cause bell crank 101 to be rotated clockwise in a manner and for the purpose already described in connection with the preferred embodiment above. In the event marking impulses are received for any of the other impulse intervals 1 to 5, inclusive, their storage levers 231 and 232 will be accordingly positioned, causing corresponding placement of the several code selector discs 234 after the selection has been completed and the transfer mechanism operated, but of particular significance in this connection will be the current characteristic of the No. 5 signal impulse.

If this signal impulse is again marking in nature, the succeeding operation will be the same as the one just described except for the variations which may occur in the code combination, but if instead the signal impulse corresponding to the No. 5 interval happens to be of spacing nature, then armature 208 will respond by engaging its upper contact point 209 and sword 233' will be disposed in the manner illustrated in Fig. 11. As a result of the latter incident, contactor 213 will be permitted to engage its upper contact point 219 instead of the lower contact point 218, while on account of cam apex 223, contact 214 will again be thrust against contact point 215. Thus, a circuit will be completed for energizing the magnet 212 traceable from grounded battery through the winding of magnet 212, conductor 252, contactor 213 which is then in engagement with its contact point 219, conductor 254, contactor 214 and its contact point 215, conductor 255, contact point 209 and its contactor 208 which is then in engagement with it, to ground.

As a result, magnet 212 is held energized which is the proper condition corresponding to a stop impulse until an opposite current condition is received by relay 207 causing its armature 208 to be withdrawn from contact point 209 and to engage instead contact point 211. When this occurs, contactor 214 is still held in engagement with its contact point 215 because of the described function of cam 223, which maintains said condition until after the interval corresponding to the start, S, impulse. Meanwhile, the last described movement of armature 208 causes the energizing circuit for magnet 212 to be broken and accordingly releasing its armature 236 for the purpose of initiating rotation of receiving distributor shaft 78, as aforedescribed.

Thereafter and coincident with the 0 (zero) signal interval, apex of cam 223 restores contactor 214 to its condition prevalent during the major portion of the cycle; that is, engaging its contact point 216. When this occurs, that is, when armature 208 of relay 207 engages contact point 211, marking impulses are thereafter interpreted as magnet 212 energizing impulses, because contactor 213 continues in engagement with its contact point 219, causing the magnet 212 energizing circuit to be completed over the following described course. The current originates with grounded battery 251 through the winding of magnet 212, conductor 252, contactor 213, and its contact point 219, conductor 254, contactor 214 and its contact point 216, conductor 253, contact 211 and its contactor 208, to ground. Thus, phasing of the receiving magnet 212 as well as of its controlled shaft 78 is regulated notwithstanding the reversed condition of the No. 5 and start impulses.

While the foregoing description has been explained and described with reference to specific embodiments, it is not intended to be restricted in any manner to the language of the detailed specification nor to the illustrations in the accompanying drawings, except as indicated in the hereunto appended claims.

What is claimed is:

1. A control mechanism for type wheel printing machines having four printing positions, comprising a spring yieldable type wheel lifting means, a frame supporting said type wheel having two abutments, a pair of shiftable abutment lugs each movable into alignment with one or the other of said abutments, means under the control of a pair of code combination signals for supervising the movement of one of said shiftable abutment lugs, and means under the control of a signal condition collateral to said code combination for supervising the disposition of the other one of said abutment lugs.

2. In a receiving station printer apparatus, a selector magnet responsive to current impulses for releasing to rotation a receiving distributor mechanism and for conditioning a selector apparatus, a receiving line relay having an armature responsive to alternative line current conditions, two electrical circuits connecting said line relay armature with said selector magnet, a principal switch responsive to the final impulse of a series of impulses comprising a signal for preparing one of said two alternative circuit paths to said magnet, and a shunting switch effective during certain other signal intervals only of a series for so preparing the other of said paths.

3. In a receiving selector mechanism for telegraph printers, a selector mechanism control magnet, a line relay having an armature responsive alternatively in accordance with received signal impulses, a pair of electrical circuits communicable with said line relay armature for establishing connection with said receiving magnet, a contactor responsive to a predetermined signal impulse translated to said magnet for selecting one of said two circuits and for conditioning it in contemplation of a succeeding signal, and means effective during an initial period of each signal for shunting both said circuits to make either effective to the performance of said line relay armature.

4. A mechanism for effecting supervision of four case shift conditions comprising, a first case shift regulating member responsive alternatively in accordance with a pair of code combination signals, a second regulating member responsive alternatively to a pair of single impulse conditions, and means for yieldably moving a shiftable case member to encounter one or the other of said regulating members.

5. In a receiving station apparatus, a selector magnet responsive to current impulses for releasing for rotation a receiving distributor mechanism and for conditioning a selector apparatus, a receiving line relay responsive alternatively to varying line potentials, two electrical circuits connecting a local current supply through said line relay with said selector magnet, a switch responsive to the final impulse of a series of varying line potential impulses comprising a signal for preparing one of said two circuits to said magnet, and a shunting switch effective during certain signal intervals only of a series for rendering said line relay communicative with either of said circuits.

6. In a printing telegraph apparatus, a selector mechanism, a single magnet for initiating said selector mechanism and for variably operating it in accordance with alternative line current interval variations, means responsive to certain current interval variations for energizing said magnet and to other current interval variations for deenergizing said magnet, and means effective during certain impulse intervals of a series only for energizing said magnet in response to either current variations and for deenergizing said magnet in response to succeeding opposite current variations.

7. In a system of line signaling, a transmitter station apparatus including a perforated tape control mechanism, an impulse distributor having an element for each of a series of impulses relating to a signal, means responsive to said tape control mechanism to vary the electrical characteristics of marking impulse elements of said distributor, and means for effectuating said varying means during a spacing impulse interval of each signal.

8. In a start-stop transmission system, a receiving station apparatus comprising a rotary selector shaft, frictional driving means for imparting rotation to said shaft, selective means for controlling said shaft effective invariably during a predetermined impulse of a code combination signal and independent of the electrical characteristic of said impulse, control means for disabling said selective means during a succeeding code combination impulse of electrical characteristic opposite to the electrical characteristic of said predetermined impulses, means for supervising a case shift control under the supervision of one code combination impulse and means for supervising a case shift control under the control of a plurality of said code combination impulses including said predetermined impulse.

9. In a start-stop printing telegraph system, a type shaft, a rotary selector shaft for controlling the position of said type shaft, frictional driving means for rotating said selector shaft, selective means for arresting said selector shaft effective invariably during a predetermined impulse of each code combination signal and independent of the electrical characteristic of said impulse, control means for disabling said selective means and thereby starting said selector shaft during a succeeding code combination impulse of electrical characteristic opposite to the electrical characteristic of said predetermined impulse, means for supervising a case shift control of said type shaft under the supervision of one of said code combination impulses and means for effecting a case shift control of said type shaft under the supervision of a plurality of said code combination impulses including said predetermined impulse.

10. In a telegraph system, a printing mechanism comprising a type unit capable of assuming four case positions, a selector mechanism responsive permutatively to the impulses of a code combination for controlling the positioning of said type unit among two of its said four case positions, a selector mechanism responsive to the alternative variations of one of the impulses of a code combination signal for determining the positioning of said type unit among the other two of its said four case positions, and yieldable means for moving said type unit to a case position in accordance with the operation of said two selector mechanisms.

11. In a telegraph transmission system, a type unit capable of assuming four case positions, spring urged means tending to move said unit from a normal position to an extreme one of its said four case positions, and a pair of interponent means for intercepting the movement of said type unit under the control of a code combination signal and also under the control of a characteristic impulse of each code combination signal.

12. In a printing telegraph apparatus, a shiftable case controlling unit, spring intervening means for urging said unit from a normal to an extreme one of a plurality of successive case positions, and interponent means responsive to two different selecting characteristics compositely for varying the extent of movement of said type unit by said spring means.

LOUIS M. POTTS.